J. BOWMAN.
Running-Gear for Vehicles.
No. 202,142. Patented April 9, 1878.
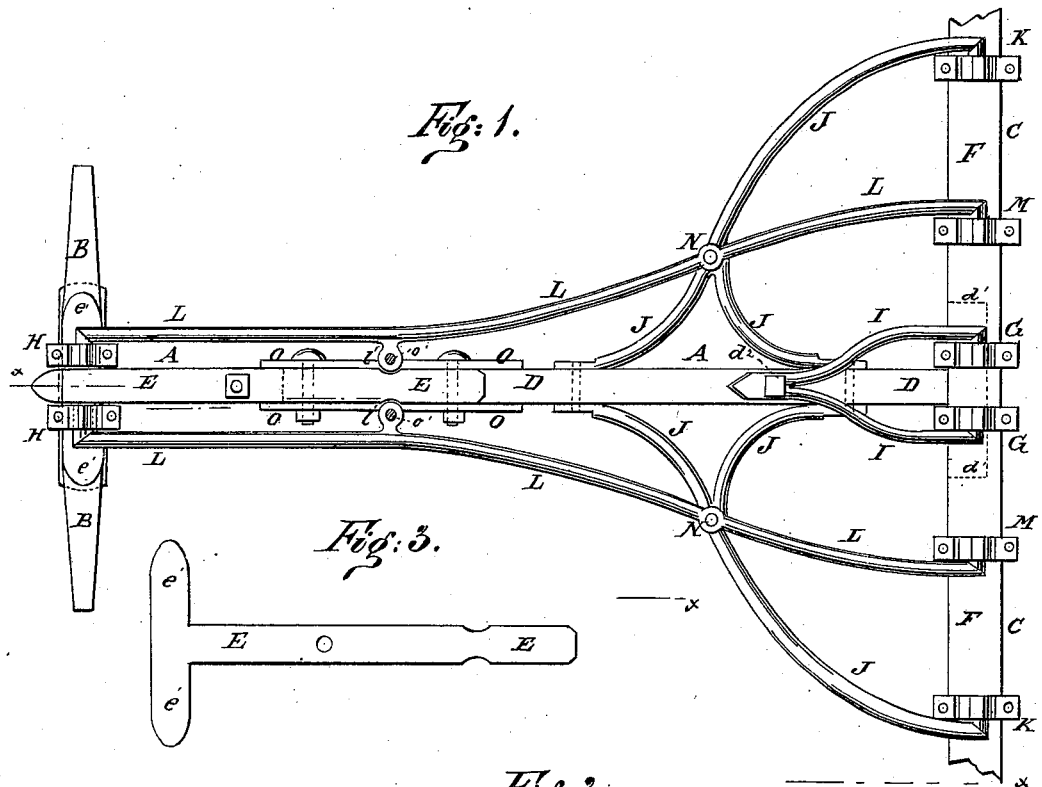
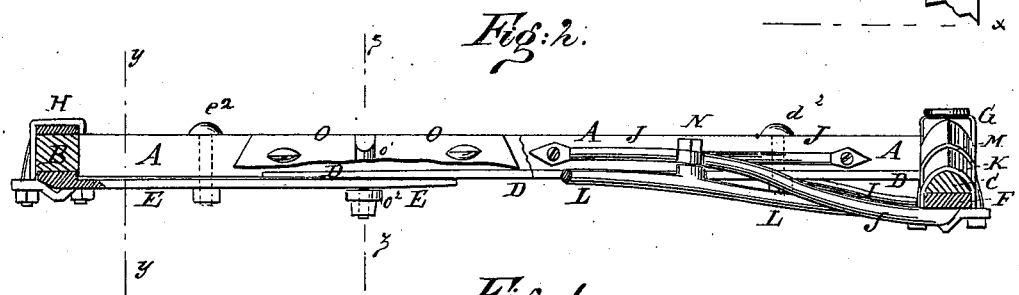
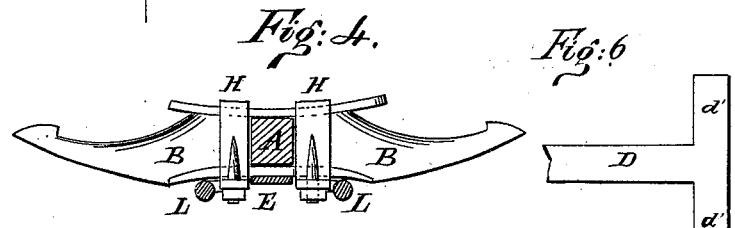
WITNESSES:
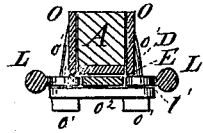
INVENTOR:
J. Bowman
BY
ATTORNEYS.

UNITED STATES PATENT OFFICE.

JONAS BOWMAN, OF SOMERSET, OHIO.

IMPROVEMENT IN RUNNING-GEARS FOR VEHICLES.

Specification forming part of Letters Patent No. 202,142, dated April 9, 1878; application filed February 27, 1878.

*To all whom it may concern:*

Be it known that I, JONAS BOWMAN, of Somerset, in the county of Perry and State of Ohio, have invented a new and useful Improvement in Running-Gears for Buggies, Wagons, &c., of which the following is a specification:

Figure 1 is a bottom view of a gearing to which my improvement has been applied. Fig. 2 is a side view of the same, partly in section, through the broken line $x\,x\,x$, Fig. 1. Fig. 3 is a detail view of the forward part of perch-iron. Fig. 4 is a cross-section taken through the line $y\,y$, Fig. 2. Fig. 5 is a cross-section, taken through the line $z\,z$, Fig. 2. Fig. 6 is a detail view of the rear end of the perch-iron.

Similar letters of reference indicate corresponding parts.

The object of this invention is to furnish an improved running-gear for buggies and other vehicles, which shall be simple in construction, strong and durable, which will allow the stays to be put on and taken off without taking the gear apart or marring the paint, and which shall be less expensive in manufacture than when made in the ordinary way.

The invention consists in a perch-iron made in two parts, having cross-heads formed upon their outer ends, and having their inner ends overlapped, in combination with the perch, the head-block, the rear-axle cap, and the spring-clips; in the combination of the side plates and the bolts and yoke, or equivalent clip, and the lugs of the side stays, with the overlapped inner ends of the parts of the perch-irons and the said side stays; in a running-gear in which the side stays and the rear stays are connected with each other at the points of crossing by bolts.

A is the perch, the forward end of which is framed to the head-block B, and its rear end is framed to the cap C of the rear axle. The perch-iron is made in two parts, D E. The rear part, D, of the perch-iron has a cross-head, $d^1$, formed upon it, which rests upon the axle F, is let into the cap C, and is made of such a length that its arms may extend beyond the spring-clips, G. The rear end of the forward part E of the perch-iron overlaps the forward end of the rear part D, and upon the forward end of the said forward part E is formed a cross-head, $e^1$, the arms of which project beyond the spring-clips H, and which is let into the head-block B, and is secured in place by the said spring-clips H. The forward part E of the perch-iron is secured to the perch by a bolt, $e^2$, and its rear part D is secured by a bolt, $d^2$. The bolt $d^2$ also secures the forward end of the V-stay I, the arms of which are spread apart and have their ends bent inward at right angles, and passed into recesses in the inner sides of the middle parts of the yokes of the spring-clips G. J are the rear stays, the inner ends of which are forked, and the arms of each are bent from each other, and are bolted to the sides of the perch A. The outer parts of the rear stays J are curved to the rearward, and their ends are bent inward at right angles, and are passed into recesses in the inner sides of the yokes of the axle-clips K. L are the side stays, the rear ends of which are bent inward at right angles, and are passed into recesses in the inner sides of the yokes of the axle-clips M. The side stays L are extended to the head-block B, and their forward ends are bent inward at right angles, and are passed into recesses in the inner sides of the middle parts of the yokes of the spring-clips H. The side stays L and the rear stays J are secured to each other at their points of crossing by the bolts N. To the opposite sides of the perch A, at the lap of the parts of the perch-iron D E, are bolted two plates, O, which are made of such a width as to cover the side edges of the forward end of the rear part D, as shown in Fig. 5. Upon the plates O are formed downwardly-projecting bolts $o^1$, which pass through lugs $l'$, formed upon the side stays L, through the ends of a yoke, $o^2$, crossing the perch-irons D E, and have nuts screwed upon their lower ends.

If desired, the bolts $o^1$ may be replaced by a clip passing over the perch A, and binding the various parts firmly together.

Having thus described my invention, I claim as new and desire to secure by Letters Patent—

1. A perch-iron made in two parts, D E, having cross-heads $d^1\,e^1$ formed upon their outer ends, and having their inner ends overlapped, in combination with the perch A, the head-block B, the rear-axle cap C, and the spring-clips G H, substantially as herein shown and described.

2. The combination of the side plates O and the bolts and yoke $o^1\ o^2$, or equivalent clip, and the lugs $l'$ of the side stays L, with the perch A, the overlapped inner ends of the parts D E of the perch-irons, and the said side stays L, substantially as herein shown and described.

3. A running-gear in which the side stays L and the rear stays J are connected with each other at the points of crossing by bolts N, substantially as herein shown and described.

4. The combination, with the perch A D, of the clip-yokes G, V-stay I, forked stay J, and side stay L, all constructed and arranged substantially as and for the purpose specified.

JONAS BOWMAN.

Witnesses:
　N. B. COOKSON,
　S. E. MEREDITH.